US010909335B2

(12) United States Patent
Lee et al.

(10) Patent No.: US 10,909,335 B2
(45) Date of Patent: Feb. 2, 2021

(54) RFID LOCATION DETECTION

(71) Applicant: Intel Corporation, Santa Clara, CA (US)

(72) Inventors: Guang-He Lee, Taipei (TW); Kalpana A. Algotar, Redlands, CA (US); Shao-Wen Yang, San Jose, CA (US); Addicam V. Sanjay, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/062,105

(22) PCT Filed: Dec. 22, 2015

(86) PCT No.: PCT/US2015/067244
§ 371 (c)(1),
(2) Date: Jun. 13, 2018

(87) PCT Pub. No.: WO2017/111931
PCT Pub. Date: Jun. 29, 2017

(65) Prior Publication Data
US 2018/0373906 A1 Dec. 27, 2018

(51) Int. Cl.
*G06K 7/10* (2006.01)
*G01S 1/04* (2006.01)
*G01S 13/75* (2006.01)
*G06K 9/62* (2006.01)

(52) U.S. Cl.
CPC ........... *G06K 7/10099* (2013.01); *G01S 1/04* (2013.01); *G01S 13/75* (2013.01); *G06K 7/10029* (2013.01); *G06K 9/6282* (2013.01)

(58) Field of Classification Search
CPC .......... G06K 7/10099; G06K 7/10029; G06K 9/6282; G01S 1/04; G01S 13/75
See application file for complete search history.

(56) References Cited

U.S. PATENT DOCUMENTS

| 2008/0180220 A1 | 7/2008 | Hollister et al. |
| 2011/0095869 A1 | 4/2011 | Yang et al. |
| 2013/0094699 A1 | 4/2013 | Ko et al. |

(Continued)

OTHER PUBLICATIONS

Object Localization by Cooperation between Human Position Sensing and Active RFID System in Home Environment, SICE Journal of Control, Measurement, and System Integration, vol. 4, No. 3, pp. 191-198, May 2011 (Year: 2011).*

(Continued)

*Primary Examiner* — Nabil H Syed
(74) *Attorney, Agent, or Firm* — Alliance IP, LLC

(57) ABSTRACT

A set of samples are returned by radio frequency identifier (RFID) reader corresponding to the readings of signals emitted from a particular RFID tag, each sample including a respective set of features identifying values of the attributes of the signals as detected. At least some of the features are provided as inputs to a random forest of decision trees, each providing a prediction that the particular RFID tag is located in one of a plurality of defined zones in a particular environment. From outputs of the plurality of decision trees based on the set of samples, it can be determined that the particular RFID tag is located in a particular one of the plurality of zones at a first instance in time.

20 Claims, 9 Drawing Sheets

(56) References Cited

U.S. PATENT DOCUMENTS

| | | | |
|---|---|---|---|
| 2014/0203914 A1 | 7/2014 | Sadr et al. | |
| 2015/0098609 A1 | 4/2015 | Sarratt et al. | |
| 2016/0003932 A1* | 1/2016 | Whitney | G01S 5/14 342/451 |
| 2016/0337812 A1* | 11/2016 | Nakagawa | H04W 4/029 |

OTHER PUBLICATIONS

International Preliminary Report on Patentability in International Application No. PCT/US2015/067244, dated Jun. 26, 2018, 10 pages.

International Search Report and Written Opinion in International Application No. PCT /US2015/067244, dated Sep. 22, 2016, 12 pages.

* cited by examiner

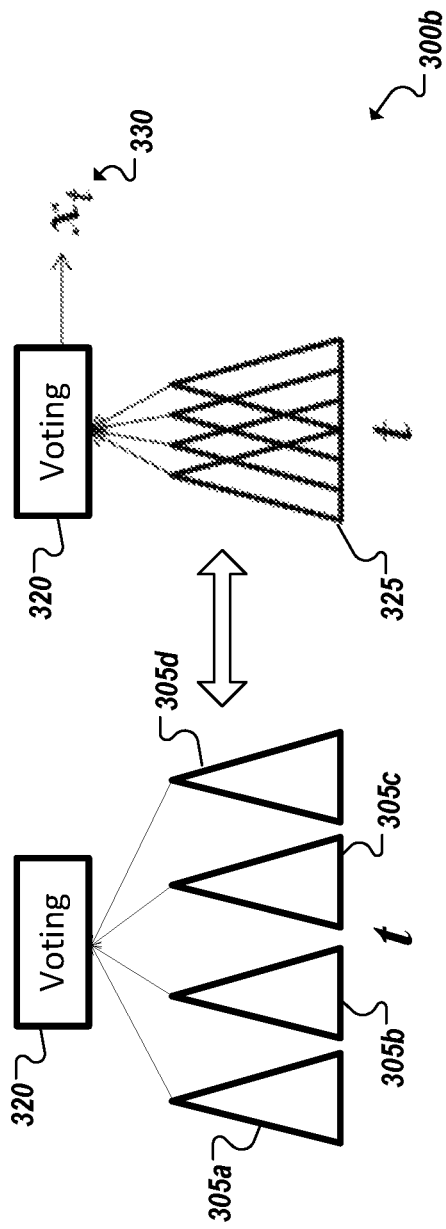
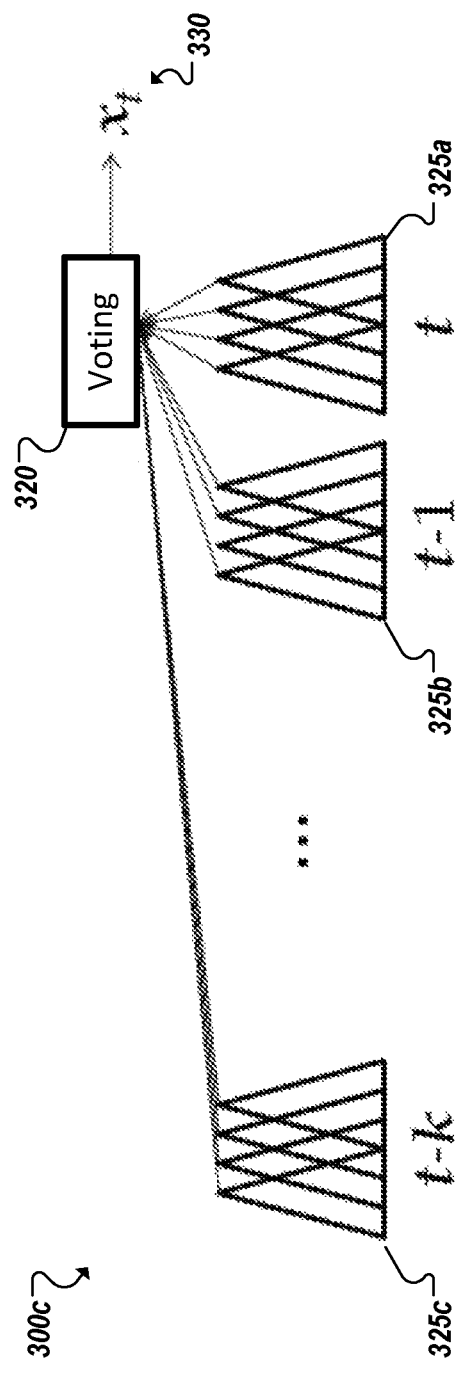
FIG. 3B
FIG. 3C

RFID LOCATION DETECTION

CROSS-REFERENCE TO RELATED APPLICATIONS

This application is a national stage application under 35 U.S.C. § 371 of PCT International Application Serial No. PCT/US2015/067244, filed on Dec. 22, 2015, and entitled RFID LOCATION DETECTION. The disclosure of the prior application is considered part of and is hereby incorporated by reference in its entirety in the disclosure of this application.

TECHNICAL FIELD

This disclosure relates in general to the field of computer systems and, more particularly, to radio frequency identification device (RFID) location tracking.

BACKGROUND

Radio frequency identification (RFID) is a noncontact automatic identification technology that can be used to automatically identify an object tagged with the RFID device, or tag. The tag can emit radio frequency signals through which related (identifying) data can be obtained by a reader. RFID tagging can be applied in a variety of use cases, including those where manual (i.e., human) intervention is undesirable or the environment conditions are hazardous or otherwise demanding. As an example, RFID technology has be used for identifying a high-speed moving object (such as a car passing through a toll booth) and can simultaneously identifying a plurality of different tags. RFID tags are divided into passive, semi-passive, and active tags, with passive tags operating without a power supply.

A typical RFID tag on a product includes an antenna and a silicon chip containing modulation circuits, control logic and non-volatile memory. The silicon chip derives electrical power from radio signals received by the antenna or from a battery, and is able to exchange data with a RFID tag scanner by demodulating and modulating the radio signals. A computer coupled to the RFID tag scanner can read and write to and from the memory of the RFID tag using radio signal transmission. Given advancement in RFID tag technology, RFID tags can be manufactured inexpensively and in inconspicuous (i.e., miniature) sizes, so that they can be integrated into ever increasing products and objects, including during the products' manufacturing or packaging.

BRIEF DESCRIPTION OF THE DRAWINGS

FIGS. 3B-3C are simplified block diagrams illustrating utilization of a random forest to determine location of a tag device.

Like reference numbers and designations in the various drawings indicate like elements.

DETAILED DESCRIPTION OF EXAMPLE EMBODIMENTS

Figure 1:
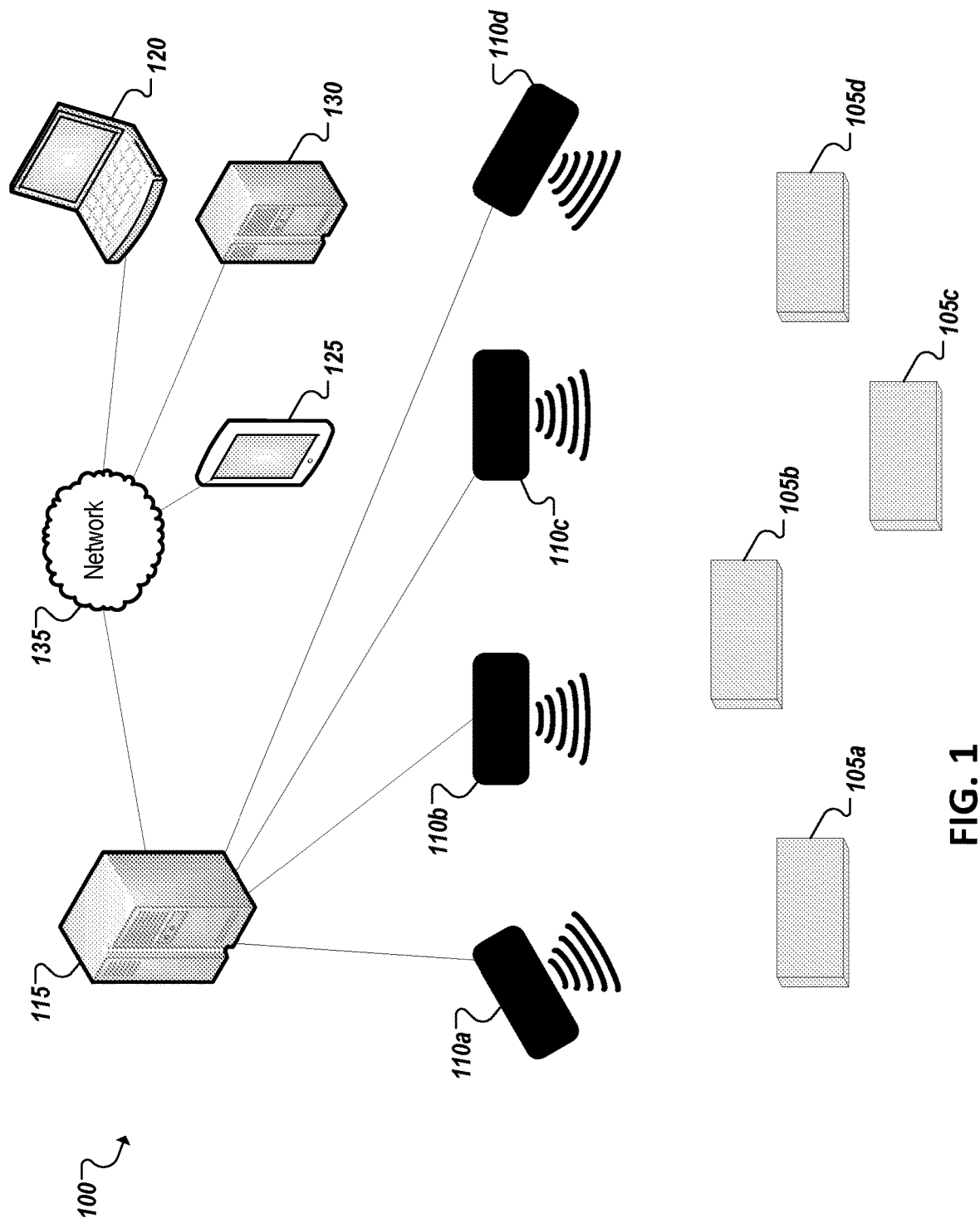
FIG. 1 illustrates an embodiment of a system including multiple tags and readers within an example localization system.

Together with satellite global positioning systems, indoor location technology is a key contributor to delivering location-based services. Radio-based indoor positioning has been a popular approach, enabling robust indoor positioning by providing global location estimations with bounded errors. However, traditional approaches to radio-based indoor positioning systems can suffer from a variety of shortcomings. For instance, providing accurate positioning results involves not only the lower error bound, but also about the upper error bound. While some conventional location solutions claim sub-meter accuracy, their overall reliability may suffer as the upper bound may be unbounded, resulting in the occasional error. The strength of a localization solution can depend on its ability to successfully take into account for a subject's percentage of reliability within a certain zone (or the bounds of that zone).

Conventional positioning technologies may also suffer in their maintainability. Changing conditions are likely in most environments in which positioning solutions are deployed. Additionally, the hardware utilized may continue to evolve. As traditional positioning technologies may involve painstaking precision and lengthy and expensive deployment and configurations times, adjusting to such changes can be similarly troublesome and expensive. Indeed, the total cost of ownership (i.e., not just initial deployment) can limit localization solutions' attractiveness.

Some conventional (and emerging) tools utilize trilateraion and other techniques to derive location based on radio signal strength. Such "model-based" approaches may triangulate the position of a given device based on a radio propagation model to estimate the device's (e.g., tag's) distance from known location of beacons, or readers, utilized to triangulate the device and known transmission power of the device. Such systems often involve careful calibration of intrinsic and extrinsic parameters of the beacons (which may degrade or otherwise change unexpectedly over time). Further, the application of such systems may be limited to devices possessing strong and self-powered transmission functionality. This may foreclose less expensive (and more scalable) technologies, such as passive RFID, which involve devices that transmit or emit lower amplitude signals, making trilateration difficult or unreliable, among other example issues.

Other localization solutions may utilize a non-model approach involving the building and maintenance of a database from which location can be determined through fingerprinting (e.g., signal strength matching), and other techniques. Such non-model-based solutions, while capable of high performance and accuracy levels, may also present expensive and demanding barriers. For instance, constructing a reference database possessing the fine level of granularity needed to realize such accuracy may incur days of human and machine time and involve constant maintenance (e.g., consistently and reliably managing changes and additions to the database), among other example issues.

In some implementations, as described herein, some of the above example issues, including others, can be addressed and improved upon. For instance, in some implementations, localization can be modeled as a classification problem and a system can utilize random forest decision making, coupled with temporal bagging, to deploy simple, reliable, and easy to maintain radio localization solutions. For instance, in one example, RFID technology can be used including RFID tags (or, simply, "tags") and RFID readers (or, simply, "readers" or "beacons") coupled to an improved localization engine implemented in hardware and/or software logic. The subject matter described herein can be applied as well to other radio frequency technologies, such as WiFi technology (e.g., replacing RFID readers with WiFi access points and RFID tags with WiFi devices), Bluetooth Low Energy (BLE) technology (e.g., by replacing RFID readers with iBeacon and RFID tags with BLE tags), among other examples. Indeed, it should be appreciated that the principles of the example systems discussed herein may be equally applicable to other radio frequency communication technologies. For instance, while many of the systems described herein reference passive RFID, these other technologies, as well as variants of RFID (e.g., active or battery-assisted RFID tags (or a mix of passive and active tags)) may be utilized in some implementations.

In some implementations, an improved localization system can achieve upwards of 95% accuracy while remaining fully autonomous upon deployment. Such light maintainability can be achieved through a one-time setup utilizing redundant RFID tags to correspond to each defined zone and further utilizing supervised reinforcement. For instance, an improved localization (or "positioning" or "zoning") system may be implemented as a classification system in which there is no concept of measured physical distances. Instead, the position of a tag is classified as likely in one of a set of defined zones. The classification can be derived through the use of random forests with temporal bagging. Random forests can be applied by selecting a subset of samples, or readings, of multiple different readers reading (i.e., receiving a signal from) the subject tag at or corresponding to an instance in time. Bootstrap aggregating (or "bagging") can be utilized to select the subset. Moreover, a random forest can be composed of multiple different decision trees and different trees can utilize varying subsets of the features derivable from the tag's signals (and corresponding samples) to make their respective determination, or estimation, of the tag's location. Temporal bagging can be further employed to incorporate temporal coherence of localization by selecting subsets of samples over a window of time (i.e., over multiple instances of time) under the theoretic framework of random forests.

Further, in order to adapt to changes, redundant reference RFID tags can be deployed within an environment. The redundant tags can be placed (e.g., by a user) and predefined to correlate to a particular zone of an environment. Indeed, these reference tags can represent the "ground truth" of the learning model. Accordingly, a testing environment can be derived through the reference RFID tags to enable training of a positioning model. Such training can be utilized to develop a set of decision trees for inclusion in one or more random forests. Random forests can be utilized for model learning provided running data collection from the redundant tags. Such improved implementations can optimize the usefulness of each feature derivable from a reader sample (e.g., signal strength, amplitude, phase, etc.), particularly in instances where beacons are sparse in number and/or unevenly distributed. For instance, in one example, rather than relying on distance for localization, random forests may focus on partitioning a range of features to fit a data set (e.g., a real number feature may be partitioned into [−inf, 0], (0, 1), [1, inf]). Further, an improved localization system utilizing the principles described herein can be deployed with minimal effort, particular in comparison to convention model- and non-model based approached. For instance, deployment can involve the deployment of readers and the simple provisioning of redundant tags throughout the environments, subsets of these reference tags positioned to correspond to various physical areas, or zones, of the environment. As the true location of these reference tags are known, their identifiers (e.g., media access control (MAC) addresses) can be associated with these location without necessitating pre-recording of reference data a priori. By comparison, conventional non-model-based solutions may utilize a multitude of data in each location for training and model-based solutions may utilize a multitude of data for learning intrinsic and extrinsic parameters of beacons, among other example complexities. Additionally, through the deployment of these reference tags, these known tags can be utilized, during tag reading collection, for online reinforcement of the zone definition model and without ongoing physical maintenance in response to similar changes to the environment. For instance, reference data can be collected by the readers (among signals from non-reference tags) that corresponding to the reference tags, and this reference data can be utilized to reinforce or adapt the zoning mechanism.

FIG. 1 is a block diagram illustrating a simplified representation of a system 100 that includes a set of radio frequency identifier (RFID) tags 105*a-d* and a set of RFID reader devices 110*a-d* configured to receive signals emitted from the RFID tags 105*a-d*. In some implementations, the RFID tags are passive RFID tags configured to draw from the energy of electromagnetic signals emitted by the RFID readers 110*a-d* sent to produce their own signal in response. Accordingly, an RFID reader may send a beacon and elicit responses from one or more RFID tags within range of the RFID reader's signal. The RFID tag's response signals can include data identifying the sending RFID tag, such as a tag identifier (e.g., MAC address). The RFID readers 110*a-d* can be further configured to detect or calculate other attributes of the various tag response signals it may receive. For example, a reader may be configured to determine the amplitude, frequency, phase, and other characteristics of each response signal it receives.

A set of readers (e.g., 110*a-d*) may be present in an environment to implement a localization system for the environment. Each reader (e.g., 110*a-d*) may be communicatively coupled to a localization engine (e.g., 115) hosted on a system on premise with the readers (e.g., 110*a-d*) or remotely located and accessible over one or more networks. The localization engine 115 can include logic, implemented in hardware and/or software (executable by one or more processors of the localization system) to obtain the determined attributes of response signals received by the sensors and utilize these attributes as features assessed using a random forest tuned to localization categorizations within the environment. Additionally, the identifier (and the associated location) of each reader can be included within the features considered using the random forest. The localization engine 115 may additionally include logic to implement temporal bagging of the features collected over windows of time by the set of readers (e.g., 110*a-d*). For instance, the localization engine 115 may include memory to cache all of the samples (i.e., readings) reported by the readers (e.g., 110*a-d*) during a window of time, such that the collection of these samples, received over several consecutive reporting instances, are considered together in the random forest. In some cases, samples can be weighted such that more recently received samples are favored within the decision trees of the random forest. For instance, an additional feature considered in the random forest may be relative timing of the corresponding sample (i.e., when it was received within the window (e.g., most recently received, received n instances ago, etc.)), among other considerations, features, and examples.

The random forest implemented by the localization engine 115 can generate a collection of votes, one from each decision tree. The localization engine 115 can further include voting logic to derive the cumulative decision of the random forest, which can serve as the localization determination for a corresponding tag at that instance. In some implementations, training information can be established within an environment through multiple, statically oriented (with respect to the environment) reference RFID tags. In some cases, the environment itself can be moving (e.g., an automobile, a freight ship, freight train car, cruise ship, airplane, etc.), and localization of a given RFID tag can be determined within such a moving environment (based on training data secured from reference tags fixed within the moving environment. In either case, the localization engine 115 can train its logic and supporting random forests, based on tests utilizing readers (e.g., 110a-d) reading the reference RFID tags.

A system can additionally include one or more additional systems 120, 125, 130, which may interface with the localization engine 115 in some implementations. For instance, end user client devices (e.g., 120, 125) can be utilized to provide user interfaces to various users including administrators and developers of the localization environment and engine. For instance, an interface provided by an endpoint device (e.g., 120, 125) can be utilized to support supervised learning by the localization environment (e.g., based on the training set of reference tags, etc.). In some implementations, localization environment 115 can additionally provide one or more services and interfaces provided through one or more endpoint devices (e.g., 120, 125) can include graphical user interfaces (GUIs) providing graphical representations of the services and outcomes generated by localization system 115. Further, client systems, such as application servers or other systems (e.g., 130) hosting other applications and services can interface with the localization system 130 to consume the localization determinations and other data generated by the localization system 130 to support their own services. For example, a system (e.g., 130) may host a retail management application which can track movement of products and customers within an environment corresponding to the readers (e.g., 110a-d) and tags (e.g., 105a-b) to provide inventory tracking, inventory security, customer behavior intelligence, retail customer traffic flow information, asset tracking, personnel tracking (e.g., in a hospital or other security-sensitive environment), among other information and services, among other examples. In some implementations, systems (e.g., 130) can pool or aggregate localization determinations (and corresponding data) generated by a pool of localization engines (e.g., 115) managing multiple different locations, each utilizing a similar (or varied) localization paradigms, among other example use cases.

One or more networks (e.g., 135) can facilitate communication between localization engine 115 and readers 110a-d, as well as between localization engine 115 and other systems (e.g., 102, 125, 130) interfacing with the system. Systems can utilize wired and/or wireless connections to connect to these networks (e.g., 135) and, thereby, communicate with other devices and systems. Such networks (e.g., 135) can include wired or wireless connections and local networks, public networks, wide area networks, broadband cellular networks, the Internet, and the like.

In general, "readers," "tags," "servers," "clients," "computing devices," "network elements," "hosts," "system-type system entities," "user devices," "sensor devices," and "systems" (e.g., 105a-d, 110a-d, 115, 120, 125, 130, etc.) in example computing environment 100, can include (in some instances) electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
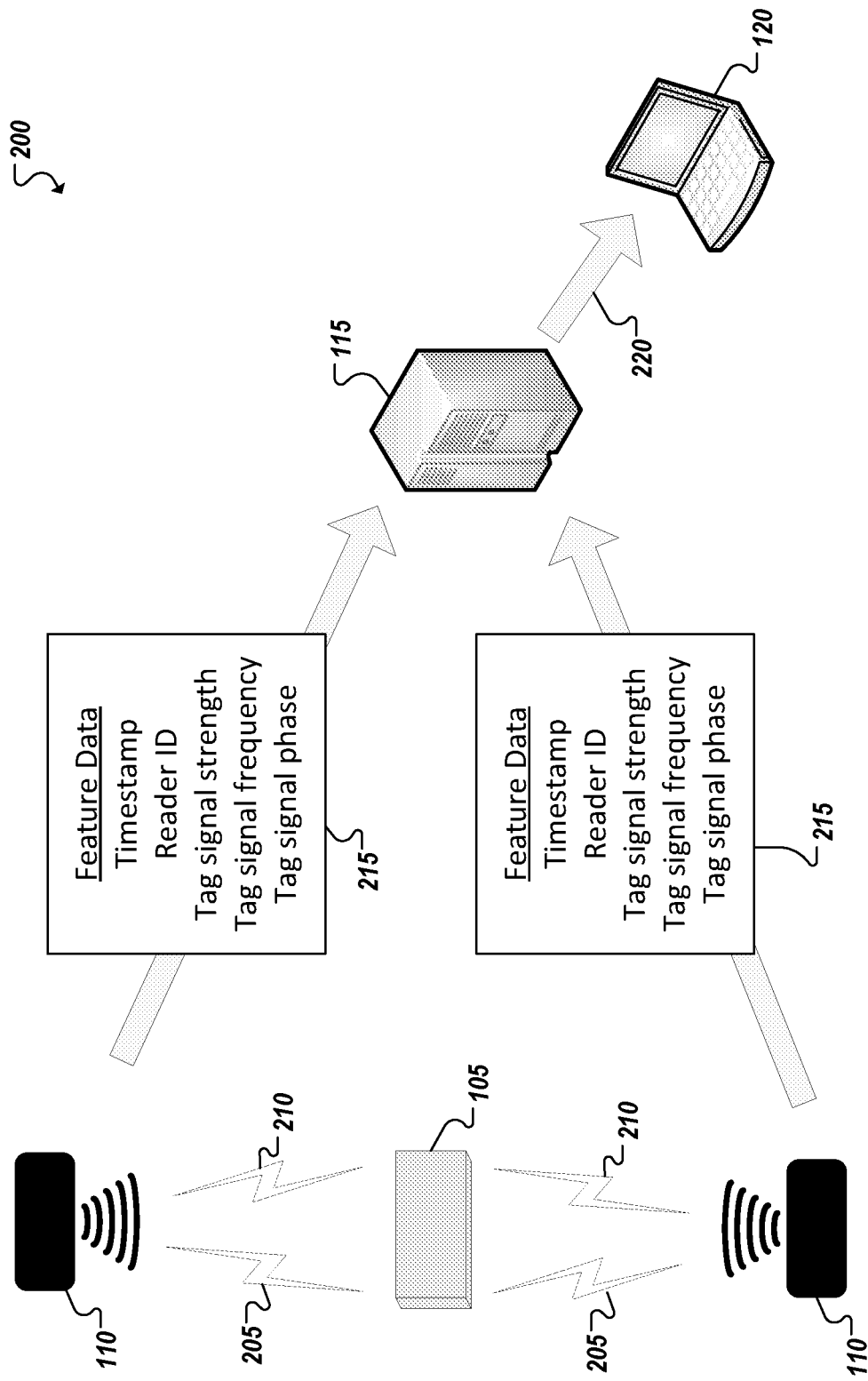
FIG. 2 is a simplified block diagram illustrating reading of a tag device by a set of readers in connection with an example localization system.

Turning to FIG. 2, a simplified block diagram 200 is shown illustrating an example communication between two or more RFID readers (e.g., 110a, 110b) and a single passive RFID tag 105. In some instances, the present solution can be ideally suited to location tracking problems involving passive RFID tags. While passive RFID tags may be poorly suited, due to their very low power signaling characteristics, to metric-based localization techniques, such as trilateralization, passive RFID tags can be used generate reliable positioning results while possessing added benefits of being lightweight, unobtrusive, battery-free, and low cost, compared to other tag implementations, among other example benefits.

Continuing with the example of FIG. 2, the readers (e.g., 110a-b) may broadcast discovery signals (e.g., 205a-b) at a particular interval. In some instances, the readers may be synchronized such that their respective signals (e.g., 205a-b) are sent together (or in a coordinated burst of signals) such that the resulting reply signals (e.g., 210a-b) of the tag (e.g., 105) correspond to a particular, common monitoring instance (or timestamp). Each reader may assess its corresponding received reply signal (e.g., 205a-b) (as well as the reply signals of potentially hundreds of other tags illuminated by the same discovery broadcasts (e.g., 205a-b)), and derive, for each reply signal, the attributes of the respective reply. Such attributes may include, the reply signal's (e.g., 210*a-b*) content (e.g., the tag's ID, to identify the tag (e.g., 105) to which the reply (e.g., 210*a-b*) applies, as well as the reply signal's amplitude, frequency, and phase, among potentially other characteristics.

The readers 110*a-b* may generate a reporting message (e.g., 215*a-b*) to identify features of the reply signals (e.g., 210*a-b*) it receives. Each reader, for each received reply signal, may assemble the respective features it determines for the reply signal and report these to the localization engine 115 in a corresponding reporting message (e.g., 215*a-b*). The features can identify the attributes of the reply signal detected by the reader, such as amplitude, frequency, and phase, as well as additional features identifying the reader and instance of the reply. For instance, the reporting message (e.g., 215*a-b*) can include a reader identifier identifying the reader (e.g., 110*a-b*) which received the corresponding reply signal. In other instances, the localization engine 115 can determine the reader identifier, or identity, from a header or other identifier utilized in the network transmission of the reporting message (e.g., 215*a-b*) to the localization engine (e.g., the reader's MAC address), among other examples. Additionally, reporting messages (e.g., 215*a-b*) can identify the timestamp of the reply signal such that the reply signal's features are considered together with other reply signals (or samples) within the same time window. In addition to features, the reporting messages may additional include a tag identifier to correlate the message with other messages relating to the same tag (e.g. 105). Indeed, upon receiving the reporting messages (e.g., 215*a-b*) from the readers (e.g., 110*a-b*), the localization engine 115 can sort the messages by tag identifier and further determine which messages are in the current time window (and which, older timestamped messages should be dropped from the current time window). The localization engine 115 can then determine (e.g., randomly, or according to another algorithm) which samples (e.g., messages) should be utilized in which decision trees (and which should not be used), with subset of features of each of the selected samples being used in each decision tree of the random forest. From the random forest analysis, the localization engine 115 can determine a location of each corresponding tag (e.g., 105) and generate 220 a result (e.g., such as an update of a GUI tracking positioning or movement of the tag) to be presented on a client device (e.g., 120) to reflect the real time positioning determined for the tag, among other example outputs.

Figure 3A:
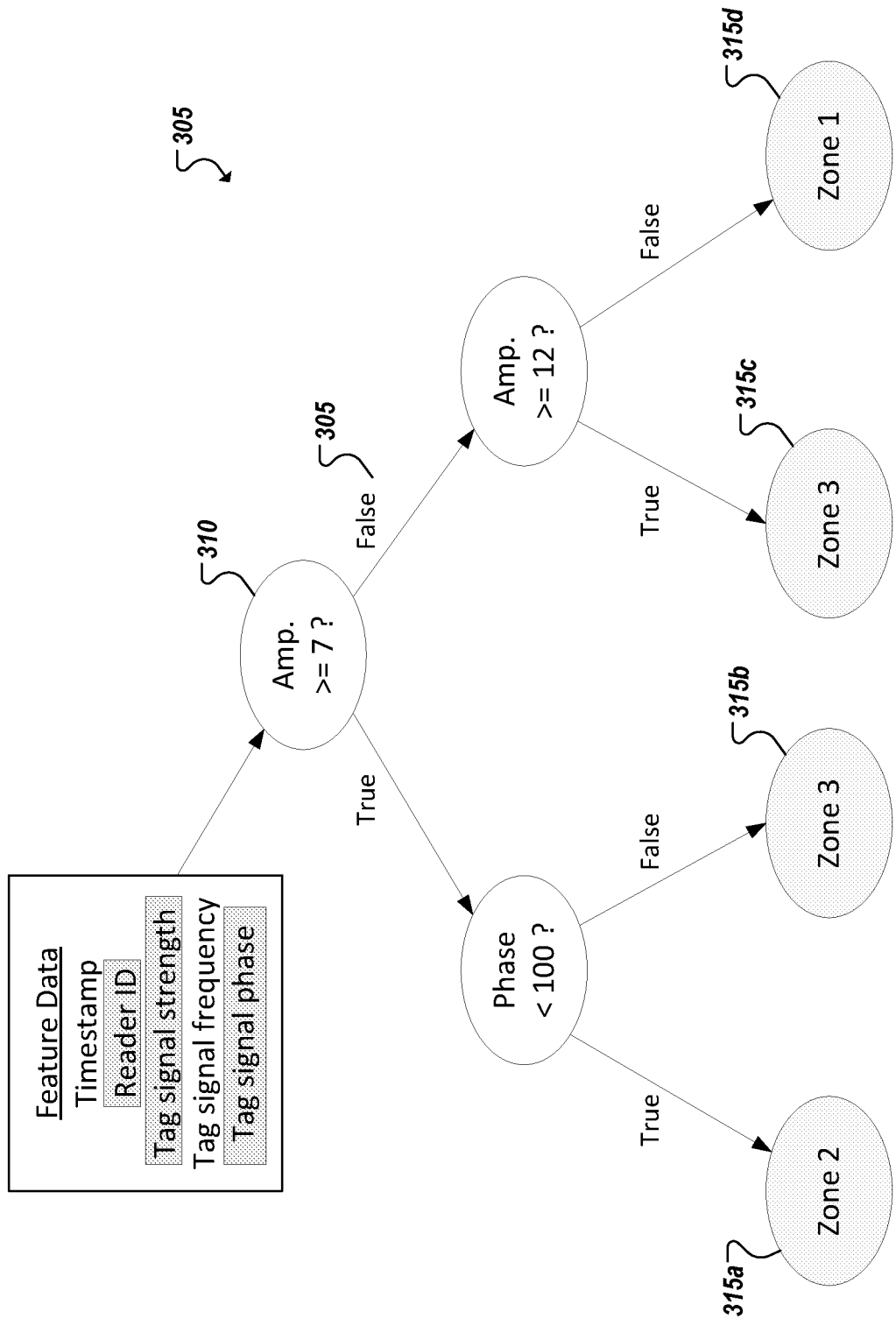
FIG. 3A is a block diagram illustrating a simplified example portion of a decision tree of a random forest.

Turning to FIG. 3A, an example is shown of a simplified example of a decision tree 305 for incorporation in one example implementation of a random forest used in localization of RFID tags. A subset of the features returned in a particular one of a subset of samples generated from reply signals of a particular tag during a particular sampling window is identified for use in the particular decision tree 305. In this example, amplitude, or signal strength, and signal phase are utilized in the decision tree 305. The reader identifier features is also used, with the known location of the reader provides context for the values of the features considered in the decision tree. The selected feature values of the sample (including reader identifier) are then fed into the root node 310 of the tree 305, with the result of each node causing the decision to progress toward one of the leaf nodes (e.g., 315*a-d*) defined in the tree. Each leaf node can designate one of the set of zone locations defined for the environment, and progressing to a particular leaf can represent the result of the decision tree, or the estimated location of the corresponding tag based on the combination of feature values defined by the path taken in the decision tree. The tree's decision can be one of multiple "votes" provided by each of the multiple, different decision trees within the random forest configured for the environment.

Turning now to FIG. 3B, a simplified block diagram 300*b* is shown illustrating an example implementation of a random forest. As noted, multiple different decision trees (e.g., 305*a-d*) can be created, each capable of making a determination, or generating a vote, for a given RFID tag's location within one of a defined set of zones within a particular environment. Each decision tree can utilize a subset of the available features and a subset of the samples can be utilized to implement a random forest 325 with the set of decision trees (e.g., 305*a-d*). The votes of the collection of decision trees (e.g., 305*a-d*) can be aggregated to determine a location result $x_t$ (330) for the tag at a particular instance of time t.

Turning to FIG. 3C, temporal bagging can be applied in combination with random foresting to improve the quality of positioning results determined by a localization system. As represented by the simplified block diagram 300*c*, by applying temporal bagging, all samples over a window of time t–k to t can be considered for use within the decision trees of the random forest to determine the location result $x_t$ (330) for the tag at time t. For instance, a set of samples can be collected for a particular RFID tag at each of times t–k through t. Each set can then be randomly sampled and applied to the random forest to determine, for each of times t–k through t, a respective position, or zone, of the particular RFID tag. The k+1 random forest results determined for each of times t–k through t can then be aggregated (e.g., averaged, weighted averaged, etc.) to determine a final position for the particular RFID tag at time t.

Random forests, and the decisions reached using the component decision trees can be based on training data D, and a set of n data points for learning a tree of the form:

$$D=\{(x_i,y_i)|x_i\in\{R,R,R,N_p\},y_i\in N_m\}$$

where $y_i$ is the zone number indicating the class to which the point $x_i$ (representing a particular combination of amplitude (or received signal strength indicator (RSSI)) value, frequency value, phase value, and antenna identifier (the "R's" representing respective real numbers and the "N's" representing respective natural numbers), where p is the number of antennas and m is the number of zones.

Random forests, as noted above, utilize bagging, or subsampling of data, and random subspace method (e.g., the subsampling of features). After training, the prediction for an unseen sample $x_t$ at time t (localization) can be made by taking the majority vote (e.g., median zone result) returned of decision trees, $$\hat{y}_t = \text{majority}(\{f_{b,t}(x_t)\}_{b=1}^B),$$

such as visualized in FIG. 3B, where B is the number of trees in the random forests and $f_{b,t}$ is the model of the b-th tree in the random forests at time t. In other implementations, rather than taking the majority, a median value or weighted voting can be determined to determine the cumulative decision of the random forest. Further, in addition to bagging and random subspace method of random forests, temporal bagging can provide a generalization of bagging, which takes into account data over a window (i.e., multiple consecutive instances) of time by subsampling over the past k instances or step, such as visualized in FIG. 3C and expressed by:

$$\hat{y}_t = \text{majority}(\{\{f_{b,t}(x_t)\}_{b=1}^{B}\}_{s=t-k}^{t}).$$

Figure 4:
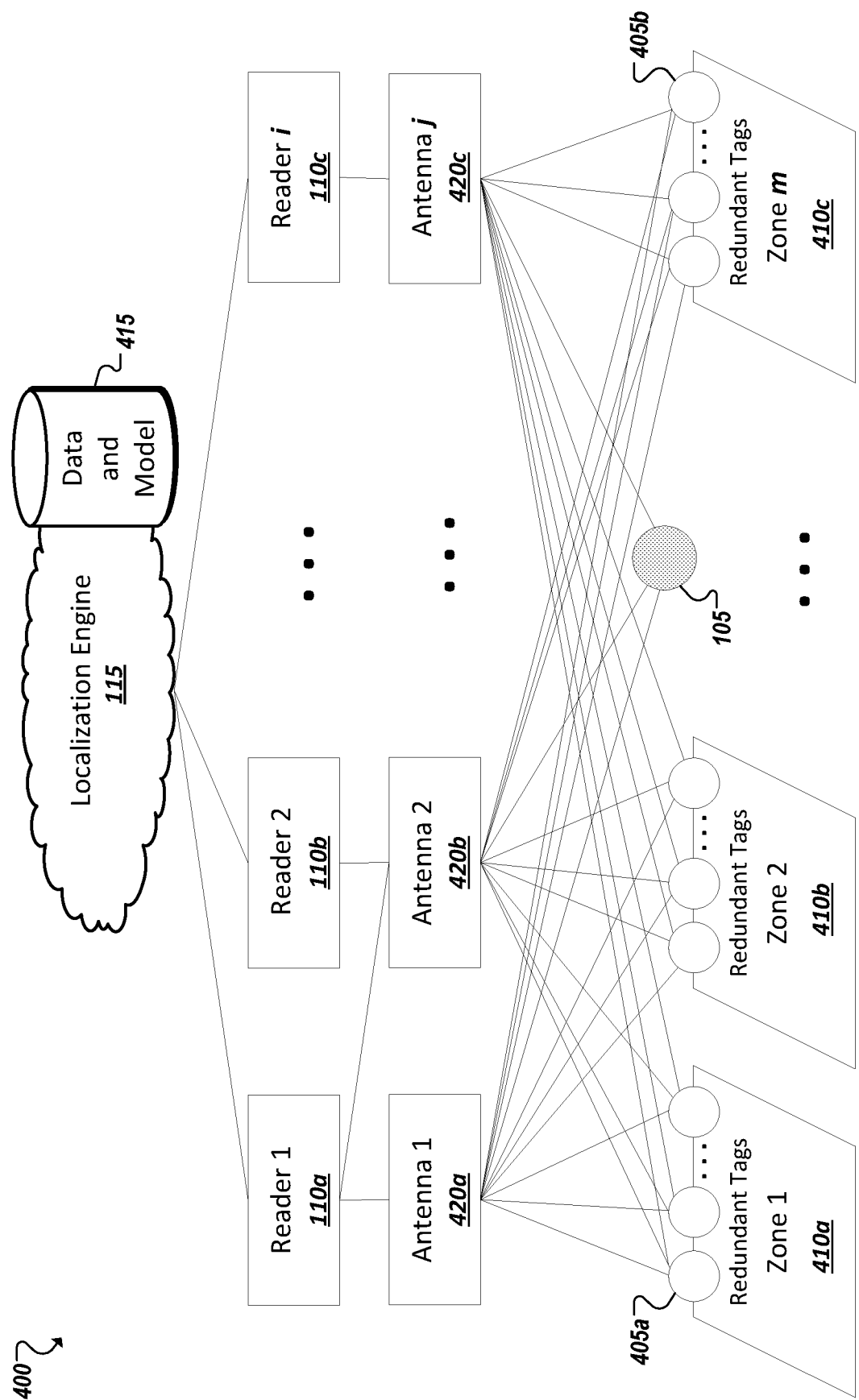
FIG. 4 is a simplified block diagram illustrating an architecture of an example localization system.

Turning to FIG. 4, a simplified block diagram is shown illustrating an architecture of a localization system, including the training of an environment for which the localization is to generate localization results. One or more tags (e.g., 105) are provided that are to be tracked, or localized, using the localization engine 115. A collection of RFID readers (e.g., 110a-c) are provided within the environment to signal, or ping, (e.g., using antenna 420a-c) the RFID tag 105 to cause the RFID tag 105 to generate reply signals in response. The localization engine 115 can be configured to determine localization for a particular environment by subdividing the geographical area (or even volume) of an environment into zones (e.g., 410a-c). To facilitate training and configuration of the localization engine 115, reference RFID tags (e.g., 405a-b) can be positioned at fixed points within each of the zones. For instance, the reference tags (e.g., 405a-b) can be affixed to a shelf, post, floor tile, rack, or other structure or part of the environment that is expected to maintain its position. Indeed, multiple reference tags can be positioned within each zone to provide redundancy and improve the training data set. For instance, reference tag 405a may be one of numerous reference RFID tags positioned within Zone 1 410a and reference tag 405b may be one of numerous reference RFID tags positioned within Zone m 410b, and so on. Each of the reference RFID tags (e.g., 405a-b) may be functionally identical to the targeted RFID tags (e.g., 105) with each being separate instances of a particular passive RFID tag, in one implementation.

During configuration of the localization engine 115, multiple readings of the reference tags (e.g., 405a-b) may be made by the same readers (e.g., 110a-c) located in the same positions that will be in during operation (i.e., tracking of targeted tags (e.g., 105)). From the attributes that are returned from the collections of reference tags at each zone, a model (e.g., 415) can be built for each zone indicating what combinations of reading values, by each respective reader (e.g., 110a-c), correspond to that collection of reference tags (and, thus, that corresponding zone). For instance, as a target tag (e.g., 105) moves or is positioned within the same environment, when its reply signals are detected by one or more of the readers (e.g., 110a-c) and determined to have attributes similar to those detected for the reference tags of a given zone, the tag (e.g., 105) is determined to be within that zone. To make this determination, a corresponding random forest of multiple different decision trees is generated based on the findings of the training (e.g., based on tendencies of samples' values from particular readers when a tag is within a given reader). This random forest can be used (e.g., with temporal bagging) as set forth herein, to determine the real time location of a target tag (e.g., 105).

As represented below, during the training of a localization engine for a particular environment, data D={$(x_v, y_v)$} from tag v, ∀v are read by readers 1, 2, . . . , i (e.g., 110a-c) through antennas 1, 2, . . . , j (e.g., 420a-c) in real time. Random forest models (e.g., 415) are trained/reinforced online with the data D. The models 415 can be tested for instance by using unlabeled data x' with tag ID z' are collected by readers i' through antennas j' at time t'. The random forest result $$\{f_{b,t'}(x_t)\}_{b=1}^{B}$$

for tag ID z' can be evaluated with data x' at time t'. The random forest results $$\{\{f_{b,t}(x_t)\}_{b=1}^{B}\}_{t=t'-k}^{t'}$$

for tag ID z' at time t'−k through t'−1 can then be accessed (e.g., from a filesystem or a database accessible to and utilized by the localization engine 115. The random forest results for tag ID z at time t'−k through t' are then used for voting for the predicted location (i.e., zone) y' at time t'. The random forest results $$\{f_{b,t'}(x_t)\}_{b=1}^{B}$$

for tag ID z at time t' are then further stored for future predictions (e.g., in the filesystem or the database).

Figure 5:
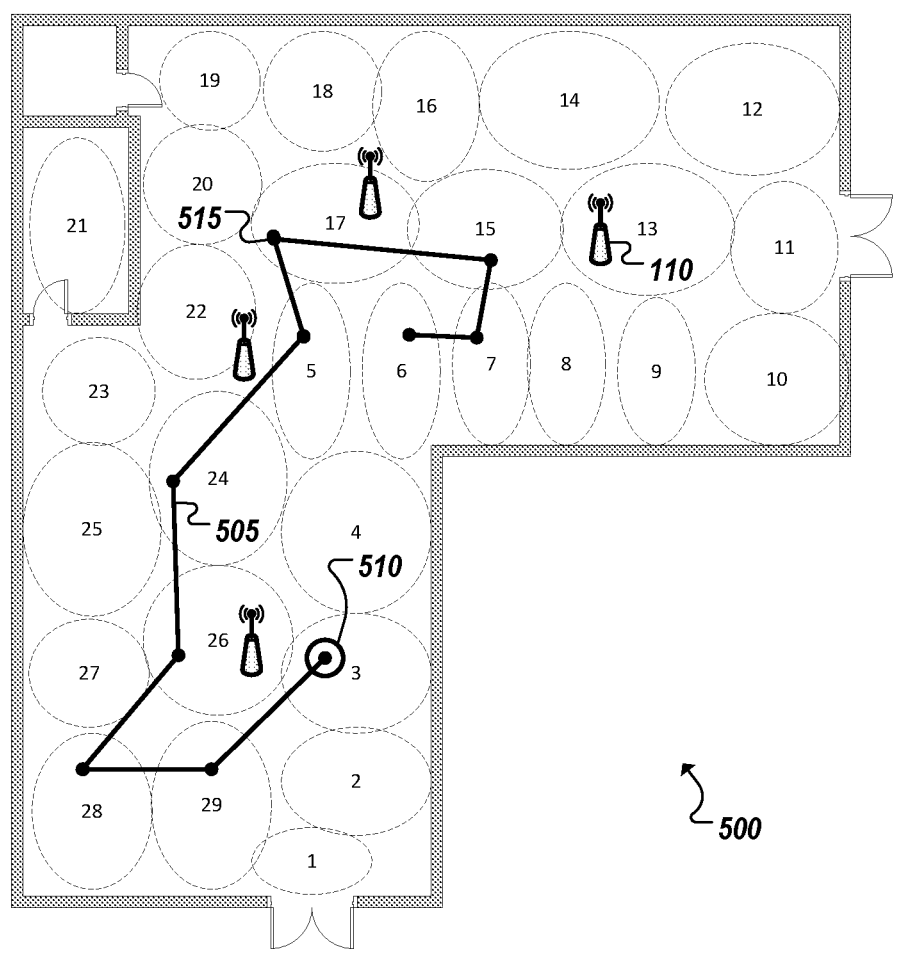
FIG. 5 illustrates an example of localization of a tag within an example floorplan.

Turning now to FIG. 5, an overhead representation of a floorplan 500 of a portion of a building is represented. For purposes of illustrating some of the principles herein, the floorplan 500 can represent an environment in which a localization engine is to be deployed. In this example environment (500) twenty-none (29) zones have been defined. In each zone, a collection of redundant reference RFID tags can be positioned (not shown). Further, a collection of RFID readers (e.g., 110) can be positioned within the environment 500. A series of readings can be performed during configuration, or training, of the environment by signaling the reference tags using the deployed readers (e.g., at a rate of 14 or more samples per minute per tag). Testing can be conducted utilizing labeled (e.g., known target) tags to validate the training (and the resulting random forest generated from the training samples).

Following training and testing, operation on live target tags can be take place within the environment. Each tag (by tag ID) can be catalogued for the environment 500 and may correspond, for instance, to merchandise, inventory, or other items within the environment 500. The localization engine can track the positioning of each of these tags (and thereby their corresponding items) concurrently and in real time. As an example, a particular tag may be first detected as located in Zone 3 (at starting point 505). Over a series of time instance, the particular tag may be detected as stationary within Zone 3 when it begins to move (e.g., because a customer picks it up the item to which it is attached and then moves around a store). The tag may then be detected as moving to Zone 29, followed by Zone 28 and Zone 26, etc., along a path 510. Data can be generated to document the movement of the particular tag within the environment 500. In some cases, a GUI or other presentation may be generated from the data generated by the localization engine based on the determined path 510, among other examples.

While, at some instances, the localization system may arrive at a location determination based upon a high degree of confidence (e.g., most of the decision trees of the random forest arrive at the same vote), while in other cases, such as boundary cases, the confidence may be lower. In some instances, the localization system can detect boundary location, for instance, based on pluralism evidenced in the votes of the random forest. For instance, at point 515, the localization engine may determine that the particular tag is most likely located in Zone 17, but may also detect a large number of votes for Zones 20 and 22. In some implementations, based on this acknowledgement of a sharing of votes between two or more zones, the localization engine can fine-tune its final location determination to bias the location near a border shared by the two or more zones. Such biasing can be represented, for instance, in a GUI presentation representing the path 515 taken by a particular tag as detected by the localization engine (e.g., similar to the representation illustrated in FIG. 5), among other examples.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figures 6A, 6B:
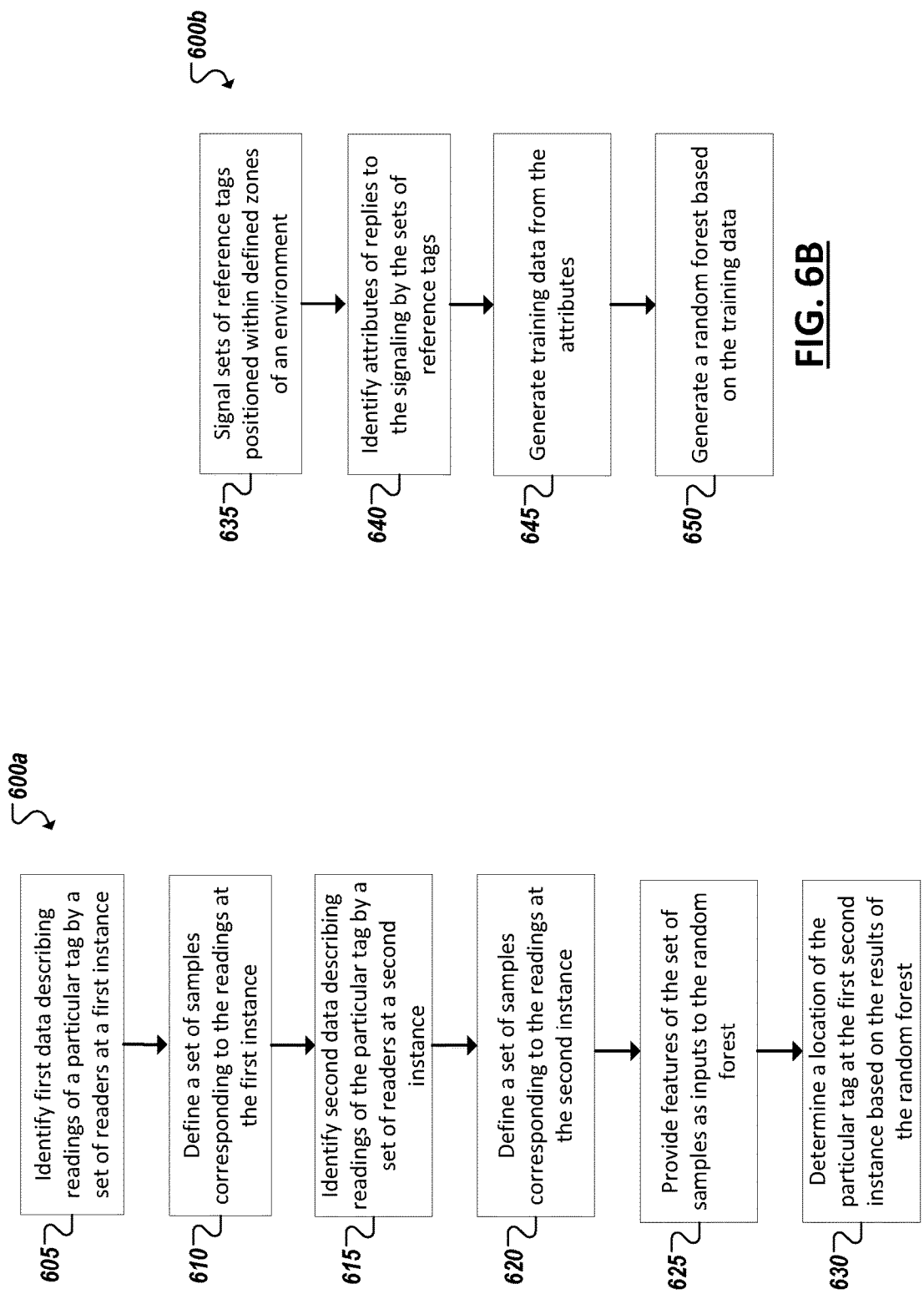
FIGS. 6A-6B are flowcharts illustrating example techniques utilizing a localization system.

FIG. 6A is a simplified flowchart 600a illustrating an example technique for determining a location of a particular RFID tag at a particular instance of time utilizing a random forest. For instance, first data can be identified 605 that was generated by a set of RFID readers in a collection of readers documenting signals received by the set of RFID readers from a particular RFID tag at a first instance. Each of the RFID readers can detect attributes of the signal as they receive it (which are likely to be at least partially dependent on each reader's respective position relative to the RFID tag when it sent the signal). Accordingly, the attributes as detected by the different readers in the set of readers is likely to be different. Each reading of each of the readers in the set can be considered (at 610) a respective sample of the particular RFID tag at that first instance. Other readings of other RFID tags can be made during the first instance (including by readers in the set reading signals of the first RFID tag) and corresponding samples can be defined (i.e., for use in locating these other RFID tags). Readings may be made by broadcasting a signal to all RFID tags within range of the respective reader, causing those RFID tags that receive the signal to generate a responsive signal. Such broadcasts can occur at a regular or irregular interval over a window of time (i.e., a series of consecutive instances of time). For instance, second data can be identified 615 documenting the readings of the same, overlapping, or entirely different set of the RFID readers deployed in an environment that received signals from the particular RFID tag during a second, subsequent instance. A corresponding set of samples can be defined 620 for readings of the particular RFID tag during the second instance.

Each of the defined sample can include a respective set of values for a set of features. The set of features can be the same across each sample (although the values are likely to vary). For instance, each sample can identify the identity of the reader making the reading, and the amplitude, frequency, and phase of the RFID tag's signal as detected by the reader at that instance (as designated by a timestamp value). The feature values can be provided to a random forest configured to generate a location prediction for the environment from the feature values. For instance, each of the decision trees of the random forest can utilize a subset of the features and return a prediction, or vote, of a particular one of a collection of defined geographical zones within the environment. Temporal bagging can be applied to select (at 625) a subset of each of the samples of the first and second instances for application of their respective features in decisions trees of the random forest. A location of the particular RFID tag at the second instance can be determined 630 based on random forest results generated from both the features of the first and second samples (as well as any other samples' features collected within a relevant time window by the RFID readers).

Turning to FIG. 6B, a flowchart 600b illustrates the generation of a random forest for use in determining positioning of RFID tags within a particular environment. For instance, a plurality of zones can be defined within the particular environment and a set of reference RFID tags can be placed in each of the zones. A plurality of statically located RFID readers can then be caused 625 to signal the sets of reference RFID tags positioned within the zones. The positions of the reference RFID tags can be known, allowing reply signals of the reference tags to be detected by the readers. Attributes of the reply signals can be identified 640 (i.e., in data generated by the readers reporting the detected replies) and training data can be generated to report the overall findings of the signaling of the reference tags. A random forest made up of multiple different decision trees can be generated 650 based on the training data. The random forest (through its composite decision trees) can effectively model each of the defined zones and the expected tag reply signal attributes as detected by the deployed readers when a RFID is any one of the defined zones. In some instances, each of the decision trees of the random forest utilizes only a subset of available features reported in any sample in the decision nodes of the decision tree.

Figure 7:
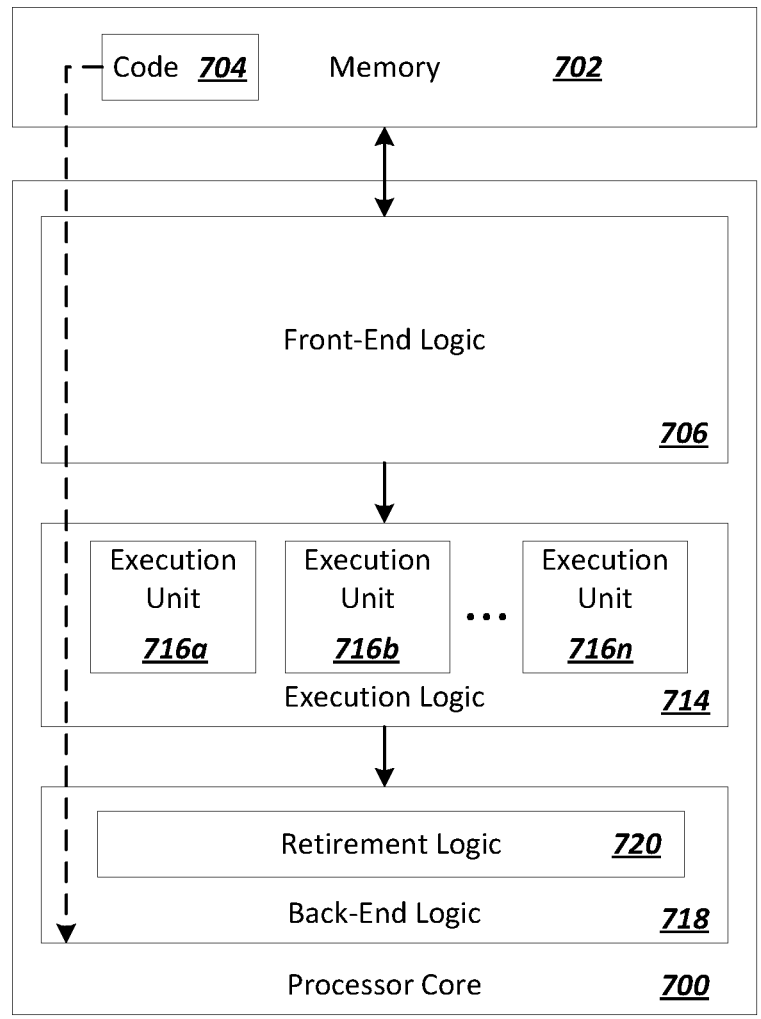
FIG. 7 is a block diagram of an exemplary processor in accordance with one embodiment.
Figure 8:
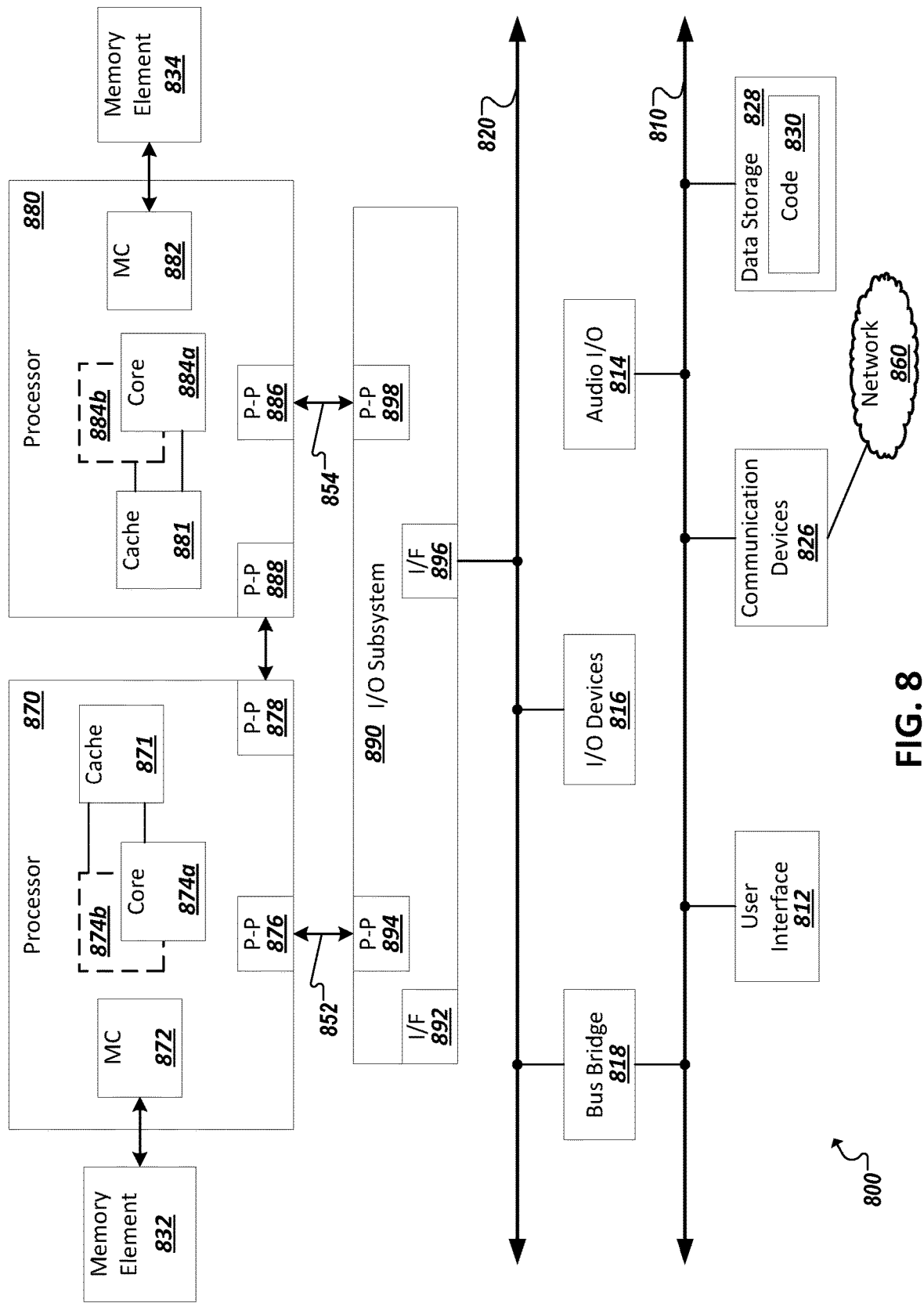
FIG. 8 is a block diagram of an exemplary computing system in accordance with one embodiment.

FIGS. 7-8 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems described herein may be configured in the same or similar manner as computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, a machine readable storage medium with code executable to identify first data from a first set of radio frequency identifier (RFID) readers in a plurality of RFID readers, the first data corresponds to one or more readings by the first set of RFID readers of one or more first signals emitted from a particular passive RFID tag at a first time instance, and the first data describing respective attributes of the first signal as detected by each of the RFID readers in the first set. A first set of samples can be defined corresponding to the readings of the first signal by the first set of RFID readers, each sample in the first set of samples corresponding to a respective one of the readings of the first signal by a corresponding one of the RFID readers, and each sample in the first set of samples including a respective set of features identifying values of the attributes of the first signal as detected by the corresponding RFID reader. Feature of the first set of samples can be provided as inputs to a random forest including a plurality of decision trees that each provide, as an output, a prediction that the particular RFID tag is located in one of a plurality of defined zones in a particular environment. From outputs of the plurality of decision trees based on the first set of samples, it can be determined that the particular RFID tag is located in a particular one of the plurality of zones at the first instance.

In one example, the first set of RFID readers includes two or more RFID readers.

In one example, the plurality of RFID readers are statically positioned within the particular environment and the random forest models the plurality of zones based on positioning of the plurality of RFID readers.

In one example, the attributes include detected amplitude, frequency, and phase of the first signal as detected by the corresponding RFID reader.

In one example, each of the sets of features of each of the samples includes an identified of the corresponding RFID reader, a value of the amplitude measured by the corresponding RFID reader, a value of the frequency measured by the corresponding RFID reader, and a value of the phase measured by the corresponding RFID reader.

In one example, each of the sets of features further includes a timestamp corresponding to the first instance.

In one example, providing features of the first set of samples as inputs to a random forest includes selecting, for each of the plurality of decision trees, a respective subset of the first set of samples.

In one example, each of the plurality of decision trees utilizes, as an input, a respective subset of the set of features.

In one example, second data can be identified from a second set of RFID readers in the plurality of RFID readers that corresponds to one or more readings by the second set of RFID readers of one or more second signals emitted from the particular RFID tag at a second time instance subsequent to the first instance, the second data describing respective attributes of the second signal as detected by each of the RFID readers in the second set. A second set of samples can be defined corresponding to the readings of the second signals by the second set of RFID readers, each sample in the second set of samples corresponding to a respective one of the readings of the second signal by a corresponding one of the second set of RFID readers, and each sample in the second set of samples including a respective set of features including values of the attributes of the second signal as detected by the corresponding RFID reader. Features of the second set of samples can be provided as inputs to the random forest and determining that the particular RFID tag is located in the particular zone can be based on outputs of the random forest to features of the first and second sets of samples.

In one example, temporal bagging using the first and second sets of samples is applied to determine that the particular RFID tag is located in the particular zone.

In one example, temporal bagging includes utilizing each set of samples determined from readings of the plurality of RFID readers within a time window including the first and second time instances.

In one example, the time window is a running time window such that a last time instance is dropped in favor of a newest current time instance.

In one example, the first and second sets of RFID readers are overlapping sets.

One or more embodiments may provide a method, a system, a machine readable storage medium with code executable to cause a plurality of sets of radio frequency identifier (RFID) tags to be signaled by a plurality of RFID readers positioned within an environment during a session, where each of the plurality of sets of RFID tags is positioned within and represents a respective one of a plurality of geographic zones within the environment. Training data can be generated based on replies to the signaling of the plurality of sets of RFID tags, the training data describing readings of the replies by the set of RFID readers during the session and each of the readings identifying respective attributes of a respective one of the replies as detected by a corresponding one of the set of RFID readers. A model of the plurality of zones can be generated including a random forest based on the training data.

In one example, each set in the plurality of sets of RFID tags includes a plurality of RFID tags statically located within the corresponding zone.

In one example, applying attributes of subsequent readings by the RFID readers of another target RFID tag as inputs to the random forests yields a prediction of that the target RFID tag is positioned within a particular one of the plurality of zones within the environment.

In one example, each of the RFID tags in the plurality of sets of RFID tags and the target RFID tag includes a respective passive RFID tag.

One or more embodiments may provide a system including one or more processor devices, computer memory, a plurality of radio frequency identifier (RFID) located within an environment, and a localization engine. The localization engine can be executable by the processor to identify first data from a first set of RFID readers in the plurality of RFID readers corresponding to one or more readings by the first set of RFID readers of one or more first signals emitted from a particular passive RFID tag at a first time instance, the first data describing respective attributes of the first signal as detected by each of the RFID readers in the first set. The localization engine can further define a first set of samples corresponding to the readings of the first signal by the first set of RFID readers, where each sample in the first set of samples corresponds to a respective one of the readings of the first signal by a corresponding one of the RFID readers, and each sample in the first set of samples includes a respective set of features including values of the attributes of the first signal as detected by the corresponding RFID reader. The localization engine can further provide features of the first set of samples as inputs to a random forest including a plurality of decision trees, where each of the decision trees provides, as an output, a respective prediction that the particular RFID tag is located in one of a plurality of defined zones in a particular environment. The localization engine can further determine, from outputs of the plurality of decision trees based on the first set of samples, that the particular RFID tag is located in a particular one of the plurality of zones at the first instance.

In one example, logic can be trained and tested that is configured to generate training data for the environment and generate the random forest from the training data.

In one example, generating the training data include causing a plurality of sets of reference radio frequency identifier (RFID) tags to be signaled by the plurality of the RFID readers during a training session, where each of the plurality of sets of reference RFID tags is positioned within and represents a respective one of a plurality of geographic zones within the environment. Generating the training data can further include identifying replies to the signaling of the plurality of sets of RFID tags, where the training data describes readings of the replies by the set of RFID readers during the session and each of the readings identifies respective attributes of a respective one of the replies as detected by a corresponding one of the set of RFID readers.

In one example, determining that the particular RFID tag is located in the particular zone at the first instance includes using temporal bagging for the random forest to consider additional features detected in RFID reader readings of the particular RFID tag made prior to the first instance.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine accessible storage medium having code stored thereon, the code when executed on a machine, causes the machine to:
   identify first data from a first set of radio frequency identifier (RFID) readers in a plurality of RFID readers, wherein the first data corresponds to one or more readings by the first set of RFID readers of a first signal emitted from a particular passive RFID tag at a first time instance, and the first data describes respective attributes of the first signal as detected by each of the RFID readers in the first set;
   define a first set of feature vectors corresponding to the readings of the first signal by the first set of RFID readers, wherein each feature vector in the first set of feature vectors corresponds to a respective one of the readings of the first signal by a corresponding one of the RFID readers, each feature vector in the first set of feature vectors comprises a respective set of feature values, and each set of feature values comprises:
      one or more signal attribute values for the first signal as detected by a corresponding one of the first set of RFID readers, wherein the signal attribute values comprise at least one of a respective amplitude value of the first signal, a respective phase value of the first signal, or a respective frequency value of the first signal, and
      a reader identifier of the corresponding one of the first set of RFID readers;
   provide the feature vectors in the first set of feature vectors as inputs to a random forest comprising a plurality of decision trees, wherein each of the decision trees provides, as an output, a prediction that the particular RFID tag is located in one of a plurality of defined zones in a particular environment based on the sets of feature values in the first set of feature vectors; and
   determine, from outputs of the plurality of decision trees based on the first set of feature vectors, that the particular RFID tag is located in a particular one of the plurality of zones at the first instance, wherein the number of zones in the plurality of zones is greater than the number of RFID readers in the plurality of RFID readers.

2. The storage medium of claim 1, wherein the first set of RFID readers comprises two or more RFID readers.

3. The storage medium of claim 1, wherein the plurality of RFID readers are statically positioned within the particular environment, the random forest models the plurality of zones based on positioning of the plurality of RFID readers, and the random forest models are trained based on readings of signals generated by a second plurality of RFID tags statically positioned in known locations within the particular environment by the plurality of RFID readers.

4. The storage medium of claim 1, wherein each feature vector in the first set of feature vectors comprises the respective amplitude value, the respective frequency value, and the respective phase value of the first signal as detected by the corresponding RFID reader.

5. The storage medium of claim 1, wherein each feature vector in the first set of feature vectors further comprises a timestamp corresponding to the first instance.

6. The storage medium of claim 1, wherein providing features of the first set of samples as inputs to a random forest comprises selecting, for each of the plurality of decision trees, a respective subset of the first set of samples.

7. The storage medium of claim 1, wherein each of the plurality of decision trees utilizes, as an input, at least a subset of values of detected attributes described in the corresponding feature vector.

8. The storage medium of claim 1, wherein the instructions, when executed, further cause the machine to:
   identify second data from a second set of RFID readers in the plurality of RFID readers, wherein the second data corresponds to one or more readings by the second set of RFID readers of a second signal emitted from the particular RFID tag at a second time instance subsequent to the first instance, and the second data describes respective attributes of the second signal as detected by each of the RFID readers in the second set;
   define a second set of feature vectors corresponding to the readings of the second signals by the second set of RFID readers, wherein each feature vector in the second set of feature vectors corresponds to a respective one of the readings of the second signal by a corresponding one of the second set of RFID readers, and each feature vector in the second set of feature vectors comprises:
one or more signal attribute values for the second signal as detected by a corresponding one of the second set of RFID readers, wherein the signal attribute values comprise at least one of a respective amplitude value of the second signal, a respective phase value of the first signal, or a respective frequency value of the second signal;
provide the feature vectors in the second set of feature vectors as inputs to the random forest; and
wherein determining that the particular RFID tag is located in the particular zone is based on outputs of the random forest to features of the first and second sets of feature vectors.

9. The storage medium of claim 8, wherein the instructions, when executed, further cause the machine to apply temporal bagging using the first and second sets of feature vectors to determine that the particular RFID tag is located in the particular zone.

10. The storage medium of claim 9, wherein temporal bagging comprises utilizing each set of feature vectors determined from readings of the plurality of RFID readers within a time window comprising the first and second time instances.

11. The storage medium of claim 10, wherein the time window is a running time window such that a last time instance is dropped in favor of a newest current time instance.

12. The storage medium of claim 8, wherein the first and second sets of RFID readers are overlapping sets.

13. At least one non-transitory machine accessible storage medium having code stored thereon, the code when executed on a machine, causes the machine to:
cause a plurality of sets of radio frequency identifier (RFID) tags to be signaled by a set of RFID readers positioned within an environment during a session, wherein each of the plurality of sets of RFID tags is positioned within and represents a respective one of a plurality of geographic zones within the environment, the set of RFID readers are statically positioned within the environment, and the number of RFID readers in the set is fewer than the number of geographic zones in the plurality of geographic zones;
generate a training data set based on replies to the signaling of the plurality of sets of RFID tags, wherein each training data entry in the training data set describes attributes of one or more of the replies detected by a corresponding one of the set of RFID readers during the session, and the attributes comprise:
an amplitude value for the one or more replies as detected by the corresponding one of the set of RFID readers,
a frequency value for the one or more replies as detected by the corresponding one of the set of RFID readers, and
a phase value for the one or more replies as detected by the corresponding one of the set of RFID readers; and
generate a model of the plurality of zones comprising a random forest based on the training data, wherein the random forest is to determine that a mobile RFID tag signaled by the set of RFID readers within the environment is in a particular one of the first plurality of geographic zones, the random forest accepts as an input a feature vector to comprise:
one or more signal attribute values for a signal generated by the mobile RFID and detected by a corresponding one of the set of RFID readers, wherein the signal attribute values comprise at least one of a respective amplitude value of the signal, a respective phase value of the signal, or a respective frequency value of the signal, and
a reader identifier of the corresponding one of the set of RFID readers.

14. The storage medium of claim 13, wherein each set in the plurality of sets of RFID tags comprises a plurality of RFID tags statically located within the corresponding zone.

15. The storage medium of claim 13, wherein applying attributes of subsequent readings by the RFID readers of the mobile RFID tag as inputs to the random forests yields a prediction of that the target RFID tag is positioned within a particular one of the plurality of zones within the environment.

16. The storage medium of claim 15, wherein each of the RFID tags in the plurality of sets of RFID tags and the mobile RFID tag comprises a respective passive RFID tag.

17. A system comprising:
one or more processor devices;
computer memory;
a plurality of radio frequency identifier (RFID) readers located within an environment; and
a localization engine, executable by the processor to:
identify data from a set of RFID readers in the plurality of RFID readers, wherein the data corresponds to one or more readings by the set of RFID readers of a signal emitted from a particular passive RFID tag at a first time instance, and the data describes respective attributes of the signal as detected by each of the RFID readers in the set;
define, from the attributes, a set of feature vectors corresponding to the readings of the signal by the set of RFID readers, wherein each feature vector in the set of feature vectors corresponds to a respective one of the readings of the signal by a corresponding one of the set of RFID readers, each feature vector in the set of feature vectors comprises a respective set of feature values, and each set of feature values comprises:
one or more signal attribute values for the first signal as detected by a corresponding one of the first set of RFID readers, wherein the signal attribute values comprise at least one of a respective amplitude value of the first signal, a respective phase value of the first signal, or a respective frequency value of the first signal, and
a reader identifier of the corresponding one of the first set of RFID readers;
provide feature vectors as inputs to a random forest comprising a plurality of decision trees, wherein each of the decision trees provides, as an output, a respective prediction that the particular RFID tag is located in one of a plurality of defined zones in a particular environment based on the sets of feature values in the first set of feature vectors; and
determine, from outputs of the plurality of decision trees based on the first set of feature vectors, that the particular RFID tag is located in a particular one of the plurality of zones at the instance, wherein the number of zones in the plurality of zones is greater than the number of RFID readers in the plurality of RFID readers.

18. The system of claim 17, further comprising training and testing logic configured to generate training data for the environment and generate the random forest from the training data.

19. The system of claim 18, wherein generating the training data comprises:
   causing a plurality of sets of reference radio frequency identifier (RFID) tags to be signaled by the plurality of the RFID readers during a training session, wherein each of the plurality of sets of reference RFID tags is positioned within and represents a respective one of a plurality of geographic zones within the environment; and
   identify replies to the signaling of the plurality of sets of RFID tags, wherein the training data describes readings of the replies by the set of RFID readers during the session and each of the readings identifies respective attributes of a corresponding one of the replies as detected by a corresponding one of the set of RFID readers.

20. The system of claim 17, wherein determining that the particular RFID tag is located in the particular zone at the first instance comprises using temporal bagging for the random forest to consider additional features detected in RFID reader readings of the particular RFID tag made prior to the first-instance.

* * * * *